Jan. 19, 1932.  E. J. TE PAS  1,842,330
THERMOSTATIC VALVE
Filed April 21, 1928
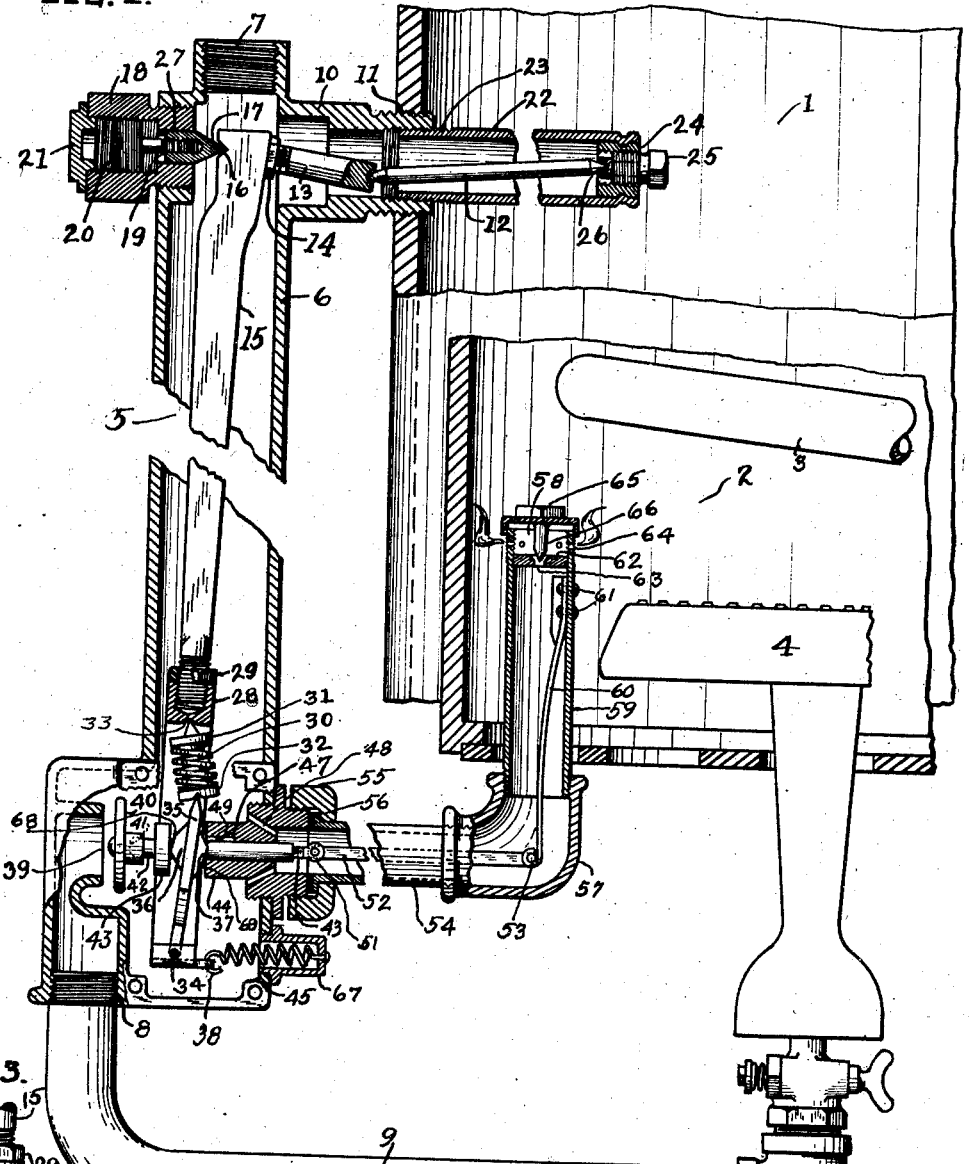
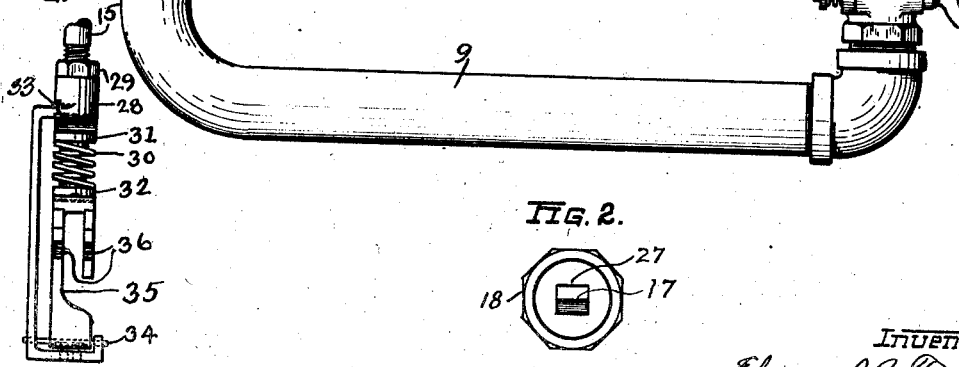
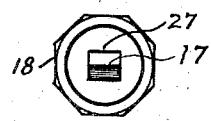
Inventor.
Edmund J. Te Pas Patented Jan. 19, 1932

1,842,330

UNITED STATES PATENT OFFICE

EDMUND J. TE PAS, OF LAKEWOOD, OHIO, ASSIGNOR TO THE PATROL VALVE COMPANY, OF CLEVELAND, OHIO, A CORPORATION OF OHIO

THERMOSTATIC VALVE

Application filed April 21, 1928. Serial No. 271,800.

This invention relates to gas burning appliances and in particular, automatic controls for the purpose of safety controlling the burner operation of such appliances.

Prior to my invention it has been the usual practice to control the operation of the burner of gas appliances, such as storage automatic water heaters, by means of a thermostatic valve that is responsive to the temperature of the water in the storage vessel. Thus when the temperature of the water drops below a certain point the thermostatic valve opens and admits gas to the main burner.

Ignition means for the burner usually comprises a constantly burning pilot. In the presence of such a pilot flame the gas issuing from the main burner is ignited and serves to raise the temperature of the water to a predetermined point, whereupon the thermostatic valve closes, shutting off the supply of gas to the main burner and prevents further heating of the water.

In this type of arrangement where the gas is automatically turned on and off and where a pilot light is depended upon for ignition, there is the possibility of a hazardous condition arising upon the event of extinguishment of the pilot light and subsequent escape of unburned gas from the main burner.

Efforts to obviate this hazardous condition have in general resulted in the provision of an additional thermostatic valve in the gas line, under control of the pilot light, so that if the pilot light should become extinguished the thermostatic valve controlled thereby will close and cut off the admission of gas to the main burner.

There are several types of thermostatic valves or safety pilots on the market today. These valves differ structurally but their function and purpose is the same. Their purpose is to prevent the admission to and the escape of raw gas from the main burner when the pilot light is not burning.

One of the objects of this invention is to provide in an appliance of the type described, a gaseous fuel control valve that is responsive to the temperature of the liquid that is being heated and which is independently controlled by the heat of a constantly burning ignition pilot.

Another object of my invention is to provide in a water heater of the type described, a highly sensitive, quick-acting, rugged thermostat.

Another object of my invention is to provide a gas burner control for water heaters that is fully automatic in its operation, having inbuilt safety features, and which is simple and inexpensive to construct and install.

Another object of my invention is to provide a simple, inexpensive thermostatic pilot light, that is operatively associated with the main burner supply valve and that prevents the admission of gas to the main burner under certain predetermined conditions.

Another object of my invention is to provide a thermostat that is highly sensitive to temperature changes over a certain portion of its range of operation.

Another object of my invention is to provide a thermostat having an expansion tube made from a copper alloy having a high coefficient of thermal expansion.

Another object of my invention is to provide in a device of the type described a simple and inexpensive thermostatic ignition pilot burner.

A further object of my invention is to provide a thermostatic valve which has an auxiliary closing means which operates to close the valve in the event the valve is not closed by the normal operating means.

In general my invention contemplates replacing two valves namely the tank thermostat and the safety pilot by a single valve under the joint control of the temperature of the liquid contents of the storage tank and the pilot light; providing a simple, safe and effective means of controlling the gas flow of a storage automatic water heater or other appliance with which it may be used.

By this construction a large number of parts are eliminated, resulting in a greatly simplified device that is not apt to become inoperative through wear or breakage.

The number of parts requiring adjustment is very small, and this should materially cut down the production assembly costs, as well as reducing servicing after the device has reached the hands of the consumer.

An important advantage of this control is the high factor of safety incidental to its operation. It is impossible to turn on the main burner supply without first providing a pilot flame for its ignition.

With the above mentioned and other objects in view, the invention consists in the novel construction, arrangement and combination of parts, hereinafter described, illustrated in some of its embodiments in the accompanying drawings and particularly pointed out in the appended claims.

The present invention includes certain features common to my copending application Serial No. 160,747 filed January 12, 1927, and applications Serial Nos. 271,801, 271,802, 271,803, 271,798 and 271,799 filed by me April 21, 1928, as well as application Serial No. 3,333 filed by L. F. Doen, January 19, 1925, and application Serial No. 123,561, filed by W. J. Snow July 19, 1926, and such common features are hereby disclaimed in the invention to which the present application relates.

Referring to the drawings, forming a part of this specification; Fig. 1 is a side elevational view in section of my improved control applied to a storage heater of the side arm type. Fig. 2 is an end elevational view of the adjustable knife edge bearing of the tank thermostat. Fig. 3 is a front elevational view of the snap action mechanism of the thermostat.

The numeral 1, indicates a tank or storage vessel positioned adjacent to the heater casing 2, that houses circulating elements 3 of the conventional type and that are adapted to be heated by the gas burner 4. The circulating elements 3 in the present case are of the coil type and are in connection at their lower and upper ends with the corresponding portions of the tank 1. When the heater is in operation the cooler water from the lower portion of the tank 1, flows to the circulating elements, is heated, and then flows to the top of the tank.

A tank thermostat 5 comprising a casing 6 having a laterally projecting portion 10, externally threaded at 11, is adapted to be received by the tank 1. The casing 6 is provided with an inlet opening 7, internally threaded for the reception of a gas supply conduit and it is further provided with an internally threaded outlet 8, adapted to receive a conduit 9 in communication with the burner 3.

Projecting into tank 1 and in contact with the liquid within this tank is a tube 22, made of material having a high coefficient of thermal expansion, such as copper or bronze. In this particular instance I prefer to use a bronze tube having a composition of 93.5% copper and 6.5% tin. Such an alloy has a much higher coefficient of thermal expansion than pure copper or any of the alloys of copper with which I am familiar.

The tube 22 is externally threaded at 23 for reception in the projecting portion 10 of the casing 5. The outer end of the tube 22 is provided with a plug 24, to receive and carry an adjusting set screw 25. The set screw 25 is centrally bored for the reception of a bearing pin 26 that provides a bearing for one end of the rod 12. The rod 12 is provided with spherical bearing points at its ends, one in contact with the end of the short rod 13, and the other in contact with the bearing member 26. The rod 13 is threadably secured to the lever 15 and locked in position by the nut 14.

The rods 12 and 13 are made of a material having a very low coefficient of thermal expansion, such as porcelain, carbon or Invar steel, so that when the thermostat is subjected to temperature changes, there will be a differential expansion of the tube 22 and the rods 12 and 13.

The compounding lever 15 has a knife edge bearing groove 16, cut in one side of its upper end. This V shaped bearing receives the knife edge 17, of the adjustable bearing member 27 which is slideably mounted in the bushing 18. The bushing 18 is provided with a closure cap 21. The member 27 is of rectangular outline in cross-section and is adjustably carried by the threaded pin 19 integrally formed on the adjusting screw 20. The elements 19 and 20 are provided with threads of different pitch in order to provide a very fine adjustment for the knife edge 17. The movement of the knife edge 17 upon the turning of the adjusting screw 20 will be proportional to the difference in pitch of the threads formed on the enlarged and reduced portions of this element.

The reason for forming the low expansion element of the thermostat from two pieces 12 and 13 instead of from a single rod as is the usual practice, is to increase the sensitivity of the thermostat over a certain portion of its range of operation. With the thermostat parts arranged as shown in Fig. 1, it is apparent that the point of contact of the rods 12 and 13 is raised and lowered as the fulcrum lever 15 swings to the right and left respectively and in this manner the effective lever arm of the acting force is respectively decreased and increased.

The thermostat elements are so arranged and proportioned that when the lever 15 has shifted to the right as far as it can move as viewed in Fig. 1 the point of contact of the rods 12 and 13 will lie below a line drawn between the knife edge 17 and the point of contact of the rod 12 and the bearing pin 26. The above referred to thermostat parts form a lever of the third class in which the acting force is applied at a point between the fulcrum and resisting force, and the mechanical advantage is less than one.

By reason of the above arrangement of forming the low expansion element of the thermostat in two parts and having one of these parts secured to the compounding lever, the thermostat is very sensitive to temperature changes approximating the temperature at which the thermostat cuts off the gas supply to the main burner.

When the elements of the thermostat are at a temperature approximating that of a cold water supply which is usually at from 60 to 70° F. the lever arm of the thermostat is so long that the sensitivity of the thermostat is a small fraction of what it was at the higher temperatures. This arrangement prevents the lower end of the compounding lever from swinging through a large arc with a large change in temperature and at the same time permits it to be highly responsive to slight temperature changes over a predetermined temperature range.

Thus by pivoting the rod 12 in the end of the rod 13 it will be seen that for various positions of the lever 15 the point of application of the acting force of the rod 12 on the fulcrum lever is in effect changed. This construction is of particular advantage in a thermostat where it is only necessary or desirable to have the thermostat sensitive over a limited range of temperature. In water heaters of the storage automatic type the thermostat should be highly sensitive to temperatures of about 170° F. as this is usually the most desirable temperature at which to maintain the water.

When the thermostat is properly adjusted, say for 170° F., the rods 12 and 13 should be substantially in line when the lever 15 is in its extreme right hand position. For reasons stated, the first movement of the rods 12 and 13 will be highly compounded and the lower end of the lever 15 will be shifted a considerable distance with a very small movement of the rods 12 and 13.

The lower end of the lever 15 carries snap action mechanism which consists of a carrier arm 28 in threaded engagement with the rod 15 and secured thereto by the locknut 29. The snap action mechanism comprises a rigid and a resilient oscillating lever. The latter consists of a spring 30 provided with suitable upper and lower abutments 31 and 32 respectively which are adapted to make a line contact with a suitable bearing groove 33 formed in the upper end of the carrier arm 28 and to provide a second knife edge bearing with the upper edge of the rigid oscillating lever 35. The lower end of the lever 35 is pivotally mounted at 34 in the lower end of the carrier arm 28.

The oscillating lever 35 is provided with contacting faces 36 and 37 respectively, adapted to contact with an annular disk 43 carried by the valve stem 42, and with the end of the valve stem guide 44. A coil tension spring 38 is secured to the lower end of the snap action carrier 28 and at its other end is supported by the thermostat casing 6 by the cap 67. The spring 38 serves to move the lever 15 in one direction and maintain it in operative engagement with the rod 12. The portion of the casing 6 which houses the snap action mechanism has an opening 45 which is adapted to be closed by a suitable cover plate not shown and is provided to facilitate the assembling and adjusting of the valve.

A valve seat 39 is integrally formed in the casing and it cooperates with a valve head 40, which is mounted on the valve stem 42 by means of a ball and socket joint 41. The valve stem 42 is carried in a valve guide element 44 which is externally threaded for reception in the casing 6. The element 44 is provided with a number of passageways 48 which are adapted at all times to furnish a supply of gas to the ignition pilot burner 58.

The guide or ported bushing 44 is provided with a longitudinally cut slot 47 for the reception of the pin 49 carried on the valve stem. The valve stem 42 is internally bored and threaded for the reception of the externally threaded rod 43. The rod 43 serves as an adjustment means for the valve head 40 and is pivotally connected at 51 to the connecting rod 52, which in turn is pivoted at 53 to the free end of a thermostatic bar or strip 60.

The thermostatic strip 60 is a composite bimetallic strip made up of two different metals, differing in their thermal characteristics, suitably welded or bonded together so that upon change in temperature the strip changes in shape. A common type of thermostatic metal is that in which one face of the strip is made of Invar steel and the other face of brass. For high temperature work brass is replaced by a ferrous alloy having a high coefficient of thermal expansion. The thermostatic strip 60 is riveted at 61 to the tube 59 of the constantly burning pilot 58.

The tube 59 is in threaded engagement with the pipe elbow 57 and has a centrally apertured disk 62 threadably received in its upper end. The upper end of the tube 59 is provided with a series of circumferentially spaced holes or burner ports 64 and is covered by an internally threaded cap 65. A needle 66 is integrally formed in the cap 65 and it is adapted to control and regulate the flow of gas through the orifice 63 of the apertured disk 62 upon the raising or lowering of the cap 65.

When gas is burning at the ports 64 the entire pilot burner and its associated parts are considerably heated thereby. Heat is conducted in this manner to the thermostatic strip 60, causing it to become distorted from a straight line position to the position shown in Fig. 1 of the drawings. At ordinary room temperatures the strip 60 would be substantially straight and upon any material increase or decrease in the temperature of the strip it would tend to assume the shape of the arc of a circle.

In the present instance the high expansion side of the thermostatic element is to the left as viewed in the drawings, causing the strip 60 to warp as shown when it is heated. The movement of the thermostatic element 60 is communicated to the valve head 40 by the connecting links 52 and 43 and the valve stem 42. The pipe elbow 57 which supports the thermostatic pilot is mounted on a pipe 54, which is provided with a union nut 55, by means of which it is detachably secured to the valve stem guide bushing 44.

A washer or gasket 56 assists in making a gas tight joint at the point of contact between the flanged end of the pipe 54 and the bushing 44. Referring to Fig. 1 of the drawings, which shows the valve in its open position, it will be seen that there is an open gas passageway between the inlet 7 and the outlet 8 of the casing 6 when the valve head 40 is in the open position.

In the operation of the device, as the temperature of the water in the tank 1 increases, the tube 22 expands. The rods 12 and 13 also expand but in a much lesser degree, due to their lower coefficient of thermal expansion. Continued heating of the water permits the spring 38 which is connected to the extreme lower end of the lever 15 to pull this lever to the right by reason of the resultant movement of the rod 12 to the right.

Referring to Fig. 1 it will be seen that as the lever 15 is swung to the right the rigid and resilient oscillating levers, which make up the snap action mechanism, will be gradually moved until they are in alignment. Continued movement of the lever 15 will cause the snap action levers to pass from their dead-center or aligned position and they are then snapped to the left by the spring 30.

When this movement of the snap action mechanism takes place the contacting faces 36 are brought into engagement with the valve stem disk 43 snapping it to the left and moving at the same time the associated valve stem 42 and the valve head 40. This movement brings the valve head into contact with its seat 39 cutting off the supply of gas to the conduit 9 and the burner 4.

Should the spring 30 fail to snap the valve closed in the manner described continued movement of the movement compounding lever 15 and the oscillating lever 35 will cause the contacting faces 36 and 37 of the above lever, to exert a wedging action between the disk 43 and the inner face of the valve stem guide 44. The wedging action above referred to is effected by reason of the angular relation of the edges 68 and 69 formed on the faces 36 and 37 and under the stated conditions the edge 68 would move to the left providing a positive valve closing means that operates independently of the spring 30.

Upon cooling of the liquid in the tank 1 the tube 22 contracts. The rods 12 and 13 also contract but in a lesser degree. As a result of the differential contraction of the tube 22 and the rods 12 and 13, the rod 12 is caused to press against the rod 13. This force is transmitted to the lever 15 causing it to swing to the left. The snap action mechanism is shifted back to its original position operating in a reverse direction but in a similar manner as described above. When the opening movement of the thermostat and its associated parts is completed the device is in the position shown in Fig. 1.

It should be noted that the snap action mechanism does not open the valve but simply shifts its oscillating lever 35 to the right. This leaves the valve free to be opened by the thermostatic metal 60 and its associated elements as will happen if the thermostatic metal is in a heated condition, indicating that the pilot light is burning. Under these conditons the valve head will be pulled to the open position as shown.

If the pilot light had been extinguished prior to the above operation, the position of the thermostatic metal would have been substantially a straight line and the valve head 27 would have been held in contact with its seat 29 by means of the thermostatic strip 60. The only element capable of opening the valve is the thermostatic strip 60 and that only when it is in a heated condition.

The safety automatic control elements herein described are shown in connection with an automatic gas fired water heater. Obviously my improved control could be used to advantage in connection with other gas burning appliances and its use is not limited to water heaters which are here shown largely for purposes of illustration and explanation.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. A thermostat comprising, a housing, a thermally responsive expansion tube mounted on said housing, a pair of relatively non-expansible longitudinally arranged angularly disposed rods carried in said tube, a fulcrum lever, a bearing for said fulcrum lever, a valve adapted to be controlled by said thermostat, and snap action means operatively carried by said fulcrum lever to impart a snap action movement to said valve.

2. A thermostat comprising, a valve, a thermostat casing, an internally threaded extension formed on said casing, an expansion tube mounted in said casing, a pair of relatively non-expanding rods mounted in said tube, a movement compounding lever in operative engagement with said rods, an adjustable knife edge bearing member providing a fulcrum point for said lever, an adjustable mounting for said knife edge bearing member having screw threaded portions of different pitch one portion of which is adapted to turn in said bearing member and the other screw threaded portion of which is adapted to turn in said internally threaded extension, and means operatively connecting said lever to said valve.

3. An automatic control for gas burning appliances comprising, a thermostat housing having gas inlet and outlet openings formed therein, thermostatic members carried by said housing, a storage tank having an opening for reception of said thermostatic members, a compounding lever operatively connected to said thermostatic members, a valve body formed in said housing and having a valve seat formed therein, a valve head cooperating with said valve seat to control fluid flow therethrough, and means including a cam shaped member operatively carried on said lever and associated with said valve head to impart a snap action motion thereto upon the predetermined movement of said compounding lever and upon further movement of said lever in valve closing direction to shift said cam to provide a positive and direct connection between said thermostatic members and said valve head whereby said valve head is pushed to its closed position by such movement of the stated operating elements.

4. A thermostatically controlled operating unit comprising, a temperature responsive tube, a pair of longitudinally arranged angularly disposed relatively non-expanding rods engaging one end of said tube and a fulcrum lever operatively associated with said rods and tube.

5. A thermostatically controlled operating unit comprising, a temperature responsive tube, a pair of relatively non-expanding contacting rods engaging one end of said tube and a fulcrum lever rigidly connected to one of said rods said rigidly connected rod being operatively associated with the other of said rods.

6. Thermostatic operating means comprising, a temperature responsive tube, a rod in universal engagement with one end of said tube, a second rod in universal engagement with said first named rod, a fulcrum lever rigidly secured to said second named rod, and an adjustable bearing at the fulcrum point of said fulcrum lever, said tube and said rods having different coefficients of thermal expansion and when subjected to temperature changes effect the operation of said fulcrum lever.

7. Thermostatic valve operating means comprising, a fulcrum lever, thermally responsive means to operate said lever connected to one end thereof, snap action mechanism carried by the other end of said lever, a valve head controlled by the operation of said lever and said snap action mechanism, said snap action mechanism being adapted to snap said valve head to a fully opened or fully closed position upon a predetermined movement of said fulcrum lever, and means including said snap action mechanism to positively close said valve upon a further movement of said fulcrum lever when moving in its valve closing direction.

8. A snap acting valve comprising, a valve body, a valve seat formed therein, a pivoted oscillating lever, a spring resisted oscillating lever contacting with the free end of said first named lever, actuating means for said levers, a valve stem, a valve head connected thereto, a disk carried by said valve stem, a bushing providing a bearing for said valve stem, angularly faced extensions carried by said pivoted oscillating lever adapted to contact with said valve stem bushing and said disk to positively move said valve head to a closed position upon a predetermined movement of said pivoted oscillating lever.

In testimony whereof I affix my signature.

EDMUND J. TE PAS.